US012525105B2

(12) United States Patent
Phua et al.

(10) Patent No.: US 12,525,105 B2
(45) Date of Patent: Jan. 13, 2026

(54) METHOD AND SYSTEM FOR A LOCKOUT IN RESPONSE TO BLOCKED VIEW

(71) Applicant: MOTOROLA SOLUTIONS, INC., Chicago, IL (US)

(72) Inventors: Jin Hoe Phua, Bayan Lepas (MY); Hui Boon Chua, Batu Pahat (MY); Zhe Qian Goh, Simpang Ampat (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 143 days.

(21) Appl. No.: 18/616,789

(22) Filed: Mar. 26, 2024

(65) Prior Publication Data

US 2025/0308356 A1 Oct. 2, 2025

(51) Int. Cl.
| | |
|---|---|
| *G08B 13/196* | (2006.01) |
| *G06T 7/11* | (2017.01) |
| *H04L 9/40* | (2022.01) |
| *G16Y 10/50* | (2020.01) |
| *G16Y 20/10* | (2020.01) |

(52) U.S. Cl.
CPC ............ *G08B 13/1961* (2013.01); *G06T 7/11* (2017.01); *H04L 63/10* (2013.01); *G06T 2207/10016* (2013.01); *G06T 2207/30232* (2013.01); *G16Y 10/50* (2020.01); *G16Y 20/10* (2020.01)

(58) Field of Classification Search
CPC ................. G08B 13/1961; G06T 7/11; G06T 2207/10016; G06T 2207/30232; H04L 63/10; G16Y 20/10; G16Y 10/50
See application file for complete search history.

(56) References Cited

U.S. PATENT DOCUMENTS

| | | | | |
|---|---|---|---|---|
| 10,242,282 B2* | 3/2019 | Loce | ................. | G06F 21/6254 |
| 11,002,827 B2* | 5/2021 | Blanco | ............ | G08B 13/19647 |
| 11,495,025 B1 | 11/2022 | Goh et al. | | |
| 11,743,580 B1 | 8/2023 | Wilkosz et al. | | |
| 2012/0274776 A1* | 11/2012 | Gupta | .............. | G08B 13/19641 |
| | | | | 382/103 |
| 2015/0244989 A1* | 8/2015 | Liao | ........................ | H04N 23/69 |
| | | | | 348/159 |
| 2015/0310624 A1* | 10/2015 | Bulan | .................... | G06V 20/54 |
| | | | | 382/103 |
| 2018/0020505 A1* | 1/2018 | Deros | ................. | F21V 33/0048 |
| 2019/0007884 A1* | 1/2019 | Koskinen | ............ | H04W 36/302 |
| 2021/0294927 A1 | 9/2021 | Kottur et al. | | |
| 2022/0397686 A1* | 12/2022 | Scacchi | ................. | G01S 19/485 |
| 2023/0087497 A1* | 3/2023 | Windsor | ................ | H04N 7/188 |
| | | | | 348/159 |

(Continued)

*Primary Examiner* — Peter D Le (57) ABSTRACT

A method and system for a lockout in response to a blocked view is disclosed. The method is carried out within at least one network. The at least one network includes at least one network addressable machine and at least one fixed-location camera having a respective Field Of View (FOV). The method includes creating an operation dependency definition between the fixed-location camera and the network addressable machine based on an inclusion of the network addressable machine within the FOV. Video analytics is employed to generate a blocked view alert in response to a blocked view threshold being satisfied in relation to the live video captured by the fixed-location camera. In response to the blocked view alert, the network addressable machine is caused to enter a lockout mode.

14 Claims, 7 Drawing Sheets

(56) References Cited

U.S. PATENT DOCUMENTS

2023/0186630 A1* 6/2023 Joseph .................... H04N 7/18
                                                    348/224.1
2023/0377434 A1* 11/2023 Eswara .............. G08B 13/1895
2025/0080697 A1    3/2025 Jurzak

* cited by examiner

METHOD AND SYSTEM FOR A LOCKOUT IN RESPONSE TO BLOCKED VIEW

BACKGROUND

The installation and presence of security cameras can act as a powerful deterrent against nefarious or undesirable activities such as theft, vandalism, and unauthorized access. Potential wrongdoers may be discouraged knowing that their actions are being captured on camera, reducing the likelihood of incidents, and protecting valuable assets and equipment. Installation of security cameras can also enable real-time monitoring of areas in the locations of the security cameras, allowing supervisors and managers to promptly identify any potential issue.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In accordance with one example embodiment, there is provided a computer-implemented method carried out within at least one network. The at least one network includes at least one network addressable machine. The at least one network also includes at least one fixed-location camera having a respective FOV. The computer-implemented method includes creating, by operation of an at least one processor, an operation dependency definition between the fixed-location camera and the network addressable machine based on an inclusion of the network addressable machine within the FOV. The computer-implemented method also includes operating the fixed-location camera to capture live video, and employing video analytics, by operation of the at least one processor, to generate a blocked view alert in response to a blocked view threshold being satisfied in relation to the live video. The blocked view threshold is satisfied when a percentage of a pixel region of the FOV, corresponding to pixels occupied by a movable object present in region of the FOV, is more than a defined amount. In response to the blocked view alert, the network addressable machine is caused to enter a lockout mode.

In accordance with another example embodiment, there is provided network apparatus that includes at least one network addressable machine and at least one fixed-location camera having a respective FOV. The fixed-location camera is configured to capture live video. The network apparatus also includes at least one processor and at least one electronic storage medium in communication with the at least one processor. The at least one electronic storage medium stores program instructions that when executed by the at least one processor cause the at least one processor to perform creating an operation dependency definition between the fixed-location camera and the network addressable machine based on an inclusion of the network addressable machine within the FOV. The program instructions when executed by the at least one processor also cause the at least one processor to perform carrying out video analytics to generate a blocked view alert in response to a blocked view threshold being satisfied in relation to the live video. The blocked view threshold is satisfied when a percentage of a pixel region of the FOV, corresponding to pixels occupied by a movable object present in region of the FOV, is more than a defined amount. The program instructions when executed by the at least one processor also cause the at least one processor to perform causing, in response to the blocked view alert, the network addressable machine to enter a lockout mode.

Each of the above-mentioned embodiments will be discussed in more detail below, starting with example system and device architectures of the system in which the embodiments may be practiced, followed by an illustration of processing blocks for achieving an improved technical method, device, and system for locking out in response to a blocked view.

Example embodiments are herein described with reference to flowchart illustrations and/or block diagrams of methods, apparatus (systems) and computer program products according to example embodiments. It will be understood that at least some of the blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Figure 1:
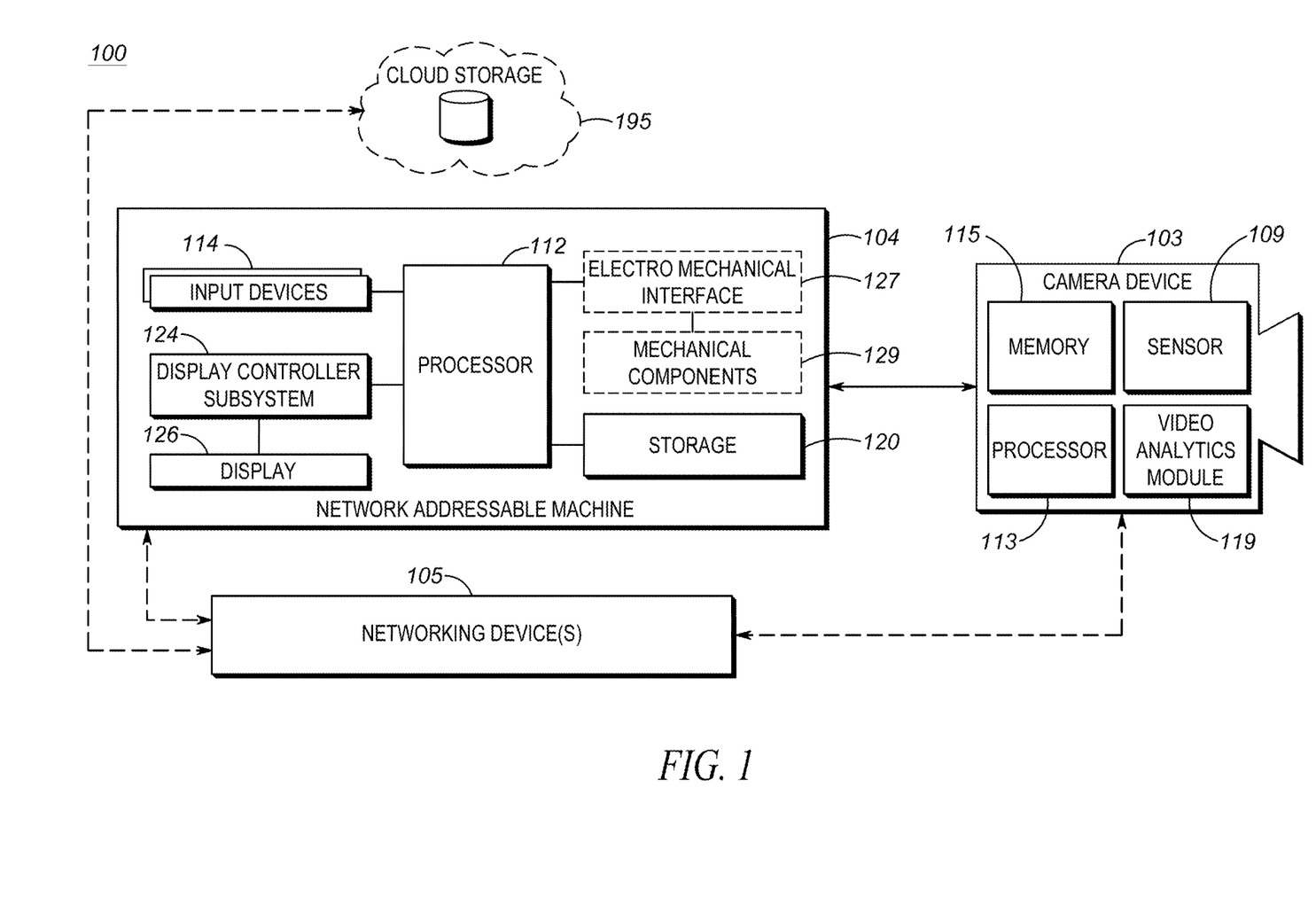
FIG. 1 is a block diagram of an at least one network in accordance with example embodiments.

Referring now to the drawings, and in particular FIG. 1 which is a block diagram of an example at least one network 100 within which methods in accordance with example embodiments can be carried out. Included within the illustrated at least one network 100 are an at least one camera device 103, an at least one network addressable machine 104 and networking device(s) 105.

The illustrated at least one network 100 can include the Internet, or one or more other public/private networks coupled together by the networking device(s) 105 and/or other communication elements. As an example and not by way of limitation, the camera device 103 and/or the network addressable machine 104 can communicate with an ad-hoc network, a Personal Area Network (PAN), a Local Area Network (LAN), a Wide Area Network (WAN), a Metropolitan Area Network (MAN), or one or more portions of the Internet or a combination of two or more of these. It is contemplated that, in at least one example, one or more of these networks may be wired; however it is also contemplated that one or more portions of one or more of these networks may be wireless. As an example, the camera device 103 and/or the network addressable machine 104 may be capable of communicating with a Wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. It is contemplated that there may be a direct communication path between the camera device 103 and the network addressable machine 104. Alternatively or additionally, the camera device 103 and the network addressable machine 104 may communicate via a communications path that includes the networking device(s) 105.

The network addressable machine 104 includes at least one processor 112 that controls the overall operation of the network addressable machine. The processor 112 interacts with various subsystems such as, for example, input devices 114 (such as a selected one or more of a keypad, keyboard, mouse, scanner, touch pad, roller ball and microphone/voice control means, for example), storage 120, display controller subsystem 124 and other subsystems. The display controller subsystem 124 interacts with display screen 126 and it renders graphics and/or text upon the display screen 126.

The illustrated network addressable machine 104 includes an electro mechanical interface 127 and mechanical components 129. The electro mechanical interface 127 and the mechanical components 129 will vary depending on the type of network addressable machine included in the at least one network 100. The electro mechanical interface 127 is in electrical communication with the processor 112, and the mechanical components 129 are in mechanical communication with the electro mechanical interface 127.

In one example, the mechanical components 129 comprise a cash drawer assembly for a cash register, and the electro mechanical interface 127 is a solenoid. In other examples, the electro mechanical interface 127 and the mechanical components 129 will be something different because the network addressable machine 104 is not necessarily a cash register. For example, the electro mechanical interface 127 may be a motor, and the mechanical components 129 may be moving parts of a machine (such as, for instance, moving parts of a machine tool, or a robot arm assembly). As another example, the mechanical components 129 may be a cash dispenser assembly included in an automated teller machine, and the electro mechanical interface 127 may be a motor. In some examples, the network addressable machine 104 may not include the electro mechanical interface 127 and mechanical components 129.

Still with reference to the network addressable machine 104, the storage 120 is, for example, one or more hard disks, solid state drives, or some other suitable form of computer readable medium that retains recorded information after the network addressable machine 104 is turned off. The storage 120 may also include volatile memory which does not retain recorded information after the network addressable machine 104 is turned off. The storage 120 may also store an operating system, the details of which will be understood by one of skill in the art and which will vary depending on how the network addressable machine 104 is designed and implemented. As will be appreciated by those skilled in the art, the processor 112 may receive any suitable software and/or firmware from the storage 120 for execution.

Optionally, the at least one network 100 may include (or include connections to) the illustrated one or more cloud services 195. For example, the network addressable machine 104 may be connected to the cloud service(s) 195 via a communications path that includes the networking device(s) 105. Similarly, the camera device 103 may be connected to the cloud service(s) 195 via a communications path that includes the networking device(s) 105. The cloud service(s) 195 may, amongst other things, include neural network(s) remote from the network addressable machine 104 and the camera device 103, and may also include functionality similar and/or complementary to functionality provided by any local computing resources consistent with implementing example embodiments herein disclosed. In at least one example, cloud storage of the cloud service(s) 195 may be at least one non-volatile storage configured to store at least a portion of the live video captured by the camera device 103. To the extent that cloud storage is provided, the cloud storage may include, for example, one or more databases which may facilitate the organized storing of any recorded video captured by camera device(s), other sensor data, etcetera in accordance with example embodiments. These one or more databases may also contain metadata related to, for example, any recorded video that is storable within the cloud storage. Examples of metadata that may be expected to be derived directly or indirectly from video data include location in field of view, object ID, bounding box-related data, tracking position relative to field of view, etc.

Regarding the camera device 103, this device is operable to capture a plurality of images and produce image data representing the plurality of captured images. The camera device 103 is an image capturing device and includes security video cameras. Furthermore, although only one camera device 103 is shown in FIG. 1 for convenience of illustration, it will be understood that the at least one network 100 may include any suitable number of camera devices.

The camera device 103 includes an image sensor 109 for capturing a plurality of images. The camera device 103 may be a digital video camera and the image sensor 109 may output captured light as a digital data. For example, the image sensor 109 may be a CMOS, NMOS, or CCD. In some embodiments, the camera device 103 may be an analog camera connected to an encoder. The illustrated camera device 103 may be a 2D camera; however use of a structured light 3D camera, a time-of-flight 3D camera, a 3D Light Detection and Ranging (LiDAR) device, a stereo camera, or any other suitable type of camera within the at least one network 100 is contemplated.

The camera device 103 may be a dedicated camera. It will be understood that a dedicated camera herein refers to a camera whose principal features is to capture images or video. In some example embodiments, the dedicated camera may perform functions associated with the captured images or video, such as but not limited to processing the image data produced by it or by another camera. For example, the dedicated camera may be a security camera, such as any one of a Pan-Tilt-Zoom (PTZ) camera, dome camera, in-ceiling camera, box camera, and bullet camera.

Additionally, or alternatively, the camera device 103 may include an embedded camera. It will be understood that an embedded camera herein refers to a camera that is embedded within a device that is operational to perform functions that are unrelated to the captured image or video. For example, the embedded camera may be a camera found on any one of a security panel, doorbell device, etc.

The camera device 103 also includes one or more processors 113, one or more video analytics modules 119, and one or more memory devices 115 coupled to the processors and one or more network interfaces. Regarding the video analytics module 119, this generates metadata outputted from the camera device 103. The metadata can include, for example, records which describe various detections of objects such as, for instance, pixel locations for the detected object in respect of a first record and a last record for the camera within which the respective metadata is being generated. In at least some examples, the video analytics module 119 includes learning machine(s) in support of the operation of the video analytics module 119.

Regarding the memory device 115, this can include a local memory (such as, for example, a RAM and a cache memory) employed during execution of program instructions. Regarding the processor 113, this executes computer program instructions (such as, for example, an operating system and/or software programs), which can be stored in the memory device 115.

In various embodiments the processor 113 may be implemented by any suitable processing circuit having one or more circuit units, including a digital signal processor (DSP), graphics processing unit (GPU) embedded processor, a visual processing unit or a vison processing unit (both referred to herein as "VPU"), etcetera, and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etcetera or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example. A system on a chip (SOC) implementation is also common, where a plurality of the components of the camera device 103, including the processor 113, may be combined together on one semiconductor chip. For example, the processor 113, the memory device 115 and the network interface of the camera device 103 may be implemented within a SOC. Furthermore, when implemented in this way, a general purpose processor and one or more of a GPU or VPU, and a DSP may be implemented together within the SOC.

In various example embodiments, the memory device 115 coupled to the processor 113 is operable to store data and computer program instructions. The memory device 115 may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etcetera or any combination thereof, for example. The memory device 115 may be operable to store memory as volatile memory, non-volatile memory, dynamic memory, etcetera or any combination thereof.

Figure 2:
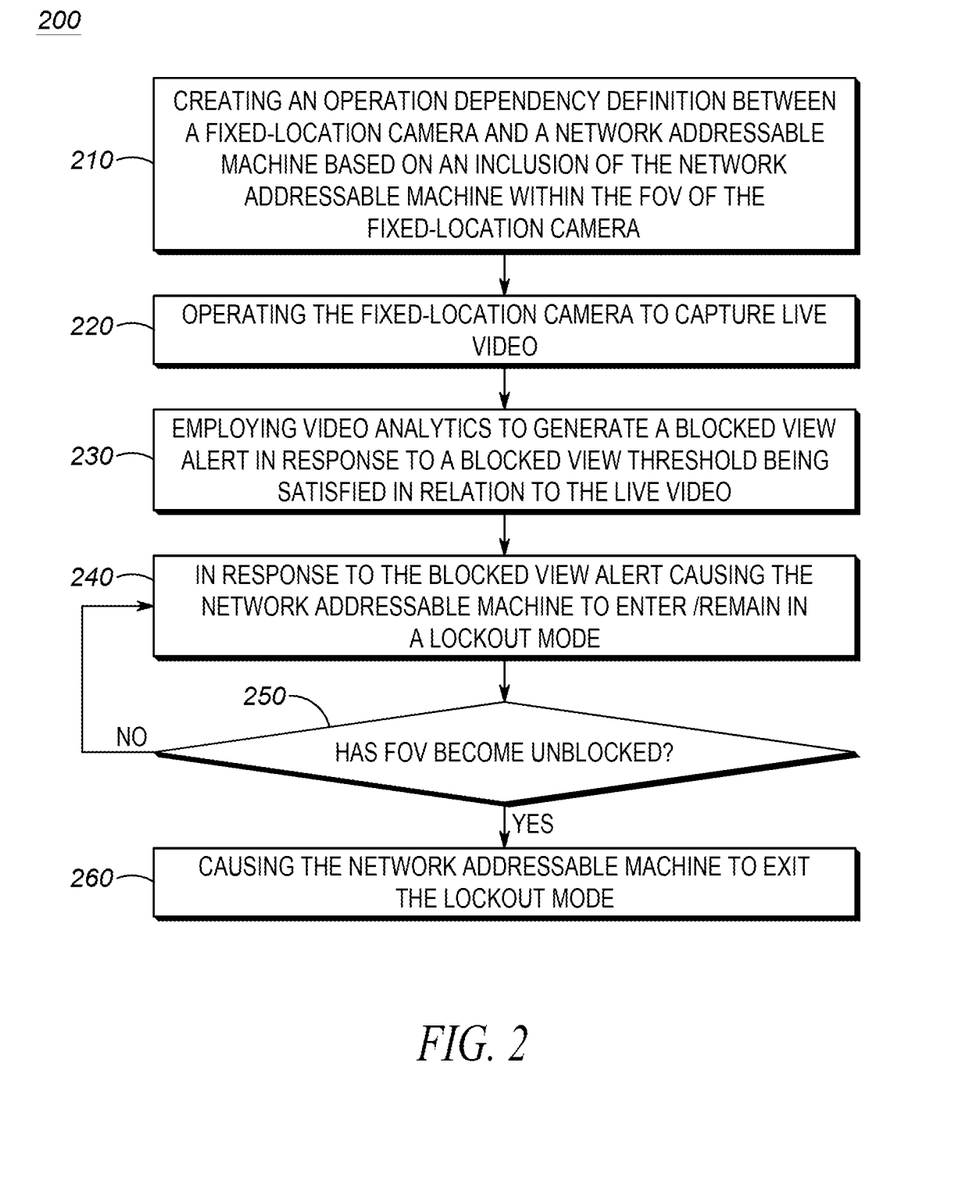
FIG. 2 is a flow chart illustrating a computer-implemented method in accordance with an example embodiment.

Reference is made to FIG. 2. FIG. 2 is a flow chart illustrating a method 200 that, in accordance with an example embodiment, may be carried out within the at least one network 100. Firstly in the method 200, an operation dependency definition is created (210) between a fixed-location camera (for example, the camera device 103 of FIG. 1) and a network addressable machine (for example, the network addressable machine 104 of FIG. 1) based on an inclusion of the network addressable machine within the FOV of the fixed-location camera.

In some examples, the network addressable machine may be an IoT device, and the configuration settings of the IoT device may be inaccessible during a lockout mode.

Next in the method 200, the fixed-location camera is operated (220) to capture live video.

Next in the method 200, video analytics is employed (230) to generate a blocked view alert in response to a blocked view threshold being satisfied in relation to the live video. In some examples, the blocked view threshold is satisfied when a percentage of a pixel region of the FOV of the camera device 103, corresponding to pixels occupied by a movable object present in region of the FOV, is more than a defined amount.

In at least one example, the blocked view condition must continuously exist in excess of a defined amount of time before the blocked view alert is generated. This may facilitate the alert not being generated for transient, unintentional blocked views. The defined amount of time may be set statically or dynamically. In at least one example, in addition to (or in alternative to) the above-described precondition, a pre-alert warning may be provided (for example, on the display screen 126 or via a speaker) before the more consequential blocked view alert is eventually generated. If the pre-alert warning is received by a person who is unintentionally creating the blocked view condition, this may facilitate that person to move prior to the more consequential blocked view alert and corresponding response at the network addressable machine 104.

Next in the method 200, in response to the blocked view alert, the network addressable machine is caused (260) to enter a lockout mode.

Next in the method 200 is decision action 250 (either "YES" the FOV of the fixed-location camera has become unblocked, or "NO" the FOV of the fixed-location camera has not become unblocked). If "YES" follows from the decision action 250, then action 260 follows (and network addressable machine is caused to exit the lockout mode). If "NO" follows from the decision action 250, then action 240 follows (and the network addressable machine remains in the lockout mode).

Figure 3:
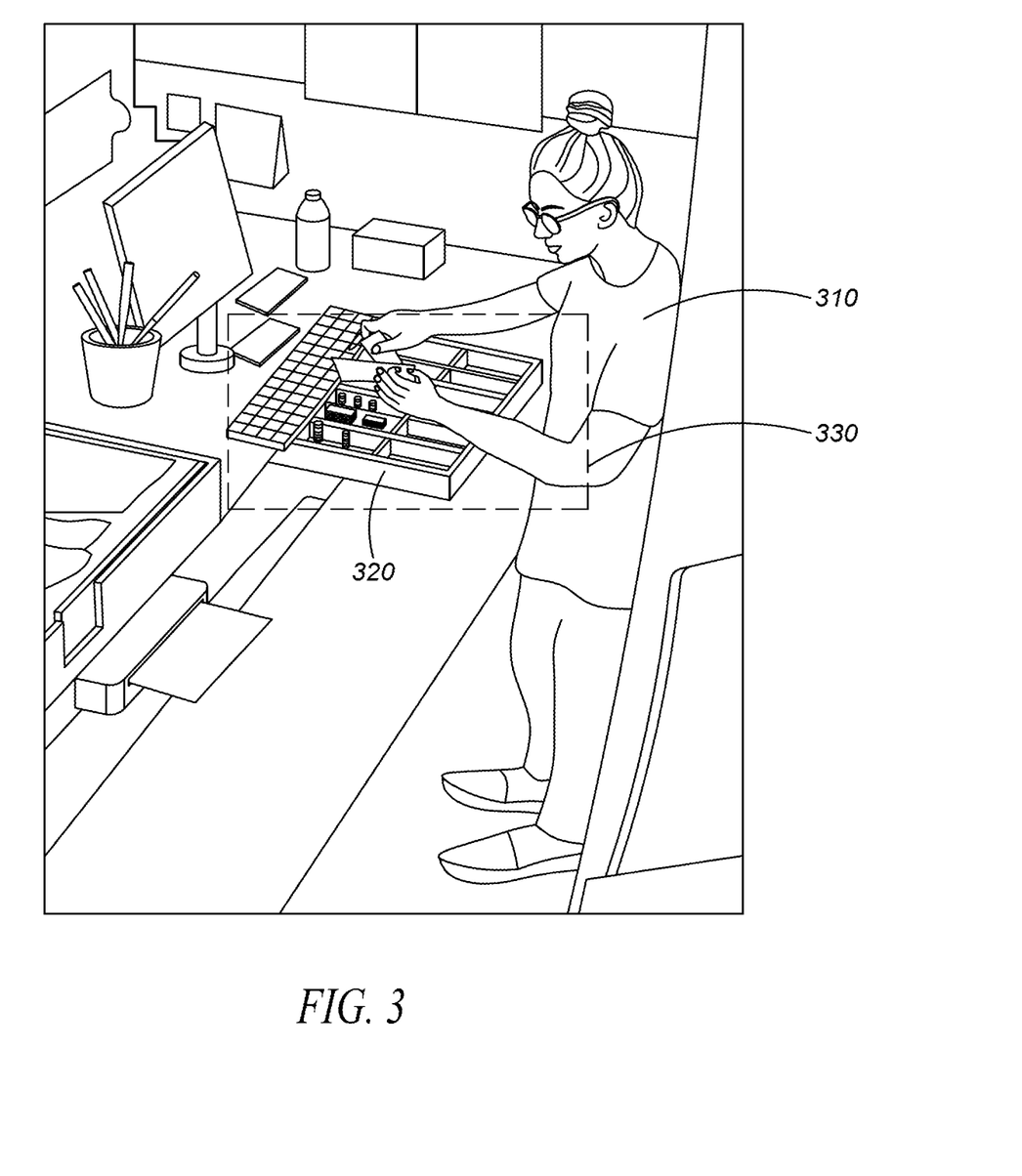
FIG. 3 is a diagram illustrating, in accordance with an example embodiment, a first image of a cashier at a cash register, the first image having been captured by a fixed-location camera having an unblocked Field Of View (FOV).

Reference is now made to FIG. 3. FIG. 3 is a diagram illustrating, in accordance with an example embodiment, a first image of a cashier 310 at a cash register 320, the first image having been captured by a fixed-location camera having an unblocked FOV.

The illustrated cash register 320 includes one or more storage compartments for cash (for instance, the one or more storage compartments may take the form of a cash drawer, which is typical for a cash register). In at least one example, the cash register 320 may be an IoT device.

Still with reference to FIG. 3, pixel region 330 is illustrated as a region which is smaller than an entire image region corresponding to the aforementioned FOV of the fixed-location camera that is aimed at the cash register 320 and its immediately surrounding physical environment. The pixel region 330 is a relevant example region for blocked view analytics (for example, pixel region in respect of which the action 230 of FIG. 2 is applicable). It will be understood that image details provided by the pixel region 330 provide more information (than a remainder of the FOV) about what are the interactions of the cashier 310 with the cash register 320. The location and dimensions of the pixel region 330 may be set manually (for example, by a user drawing a rectangle with a graphical user interface). Alternatively, the location and dimensions of the pixel region 330 may be set automatically (for example, by operation of the camera's or other video analytics which detects and recognizes objects for which a blocked view response may be needed).

Figure 4:
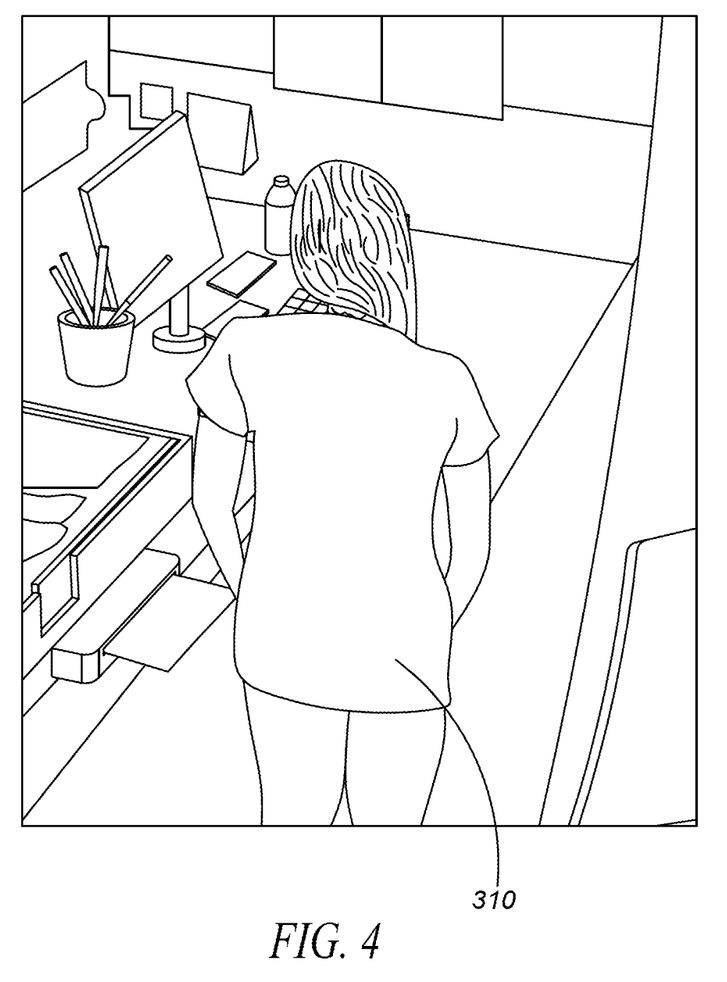
FIG. 4 is a diagram illustrating, in accordance with an example embodiment, a second image of the cashier at the cash register, the second image differing from the first image in respect of the FOV being blocked instead of unblocked.

Reference is now made to FIG. 4. FIG. 4 is a diagram illustrating, in accordance with an example embodiment, a second image of the cashier 310 at the cash register, the second image differing from the first image in respect of the FOV being blocked instead of unblocked. During the lockout mode, the cash storage compartment(s) of the cash register 320 become inaccessible.

Figure 5:
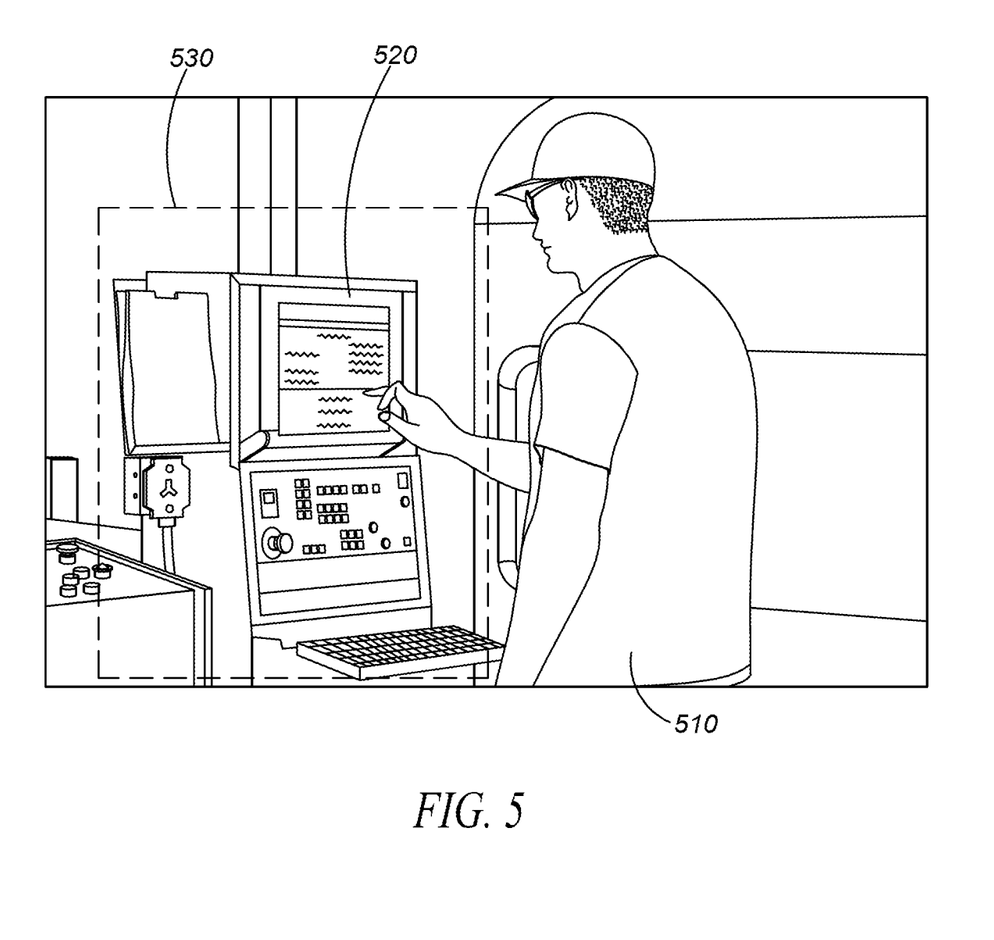
FIG. 5 is a diagram illustrating, in accordance with an example embodiment, an image of a factory worker at an input panel that controls equipment.

Reference is now made to FIG. 5. FIG. 5 is a diagram illustrating, in accordance with an example embodiment, an image of a factory worker 510 at a user input panel 520 that controls equipment. In at least one example, the user input panel 520 is an IoT device that controls equipment communicatively coupled thereto.

Pixel region 530 is illustrated in FIG. 5 as a region which is smaller than an entire image region corresponding to the aforementioned FOV of the fixed-location camera that is aimed at the user input panel 520 and its immediately surrounding physical environment. The pixel region 530 is a relevant example region for blocked view analytics (for example, pixel region in respect of the action 230 of FIG. 2 is applicable). It will be understood that image details provided by the pixel region 530 provide more information (than a remainder of the FOV) about what are the interactions of the factory worker 510 with the user input panel 520.

The location and dimensions of the pixel region 530 may be set manually (for example, by a user drawing a rectangle with a graphical user interface). Alternatively, the location and dimensions of the pixel region 530 may be set automatically (for example, by operation of the camera's or other video analytics which detects and recognizes objects for which a blocked view response may be needed).

Still with reference to FIG. 5, a lockout mode may be triggered in response to a blocked view alert, which may in turn occur in response to a blocked view threshold being satisfied when a sufficient percentage of the pixel region 530 is occupied by pixels corresponding to the factory worker 510 (or some other movable object which impedes viewing of the user input panel 520). During the lockout mode, the user input panel 520 may become temporarily inoperative or may temporarily stop accepting certain types of user input.

Figure 6:
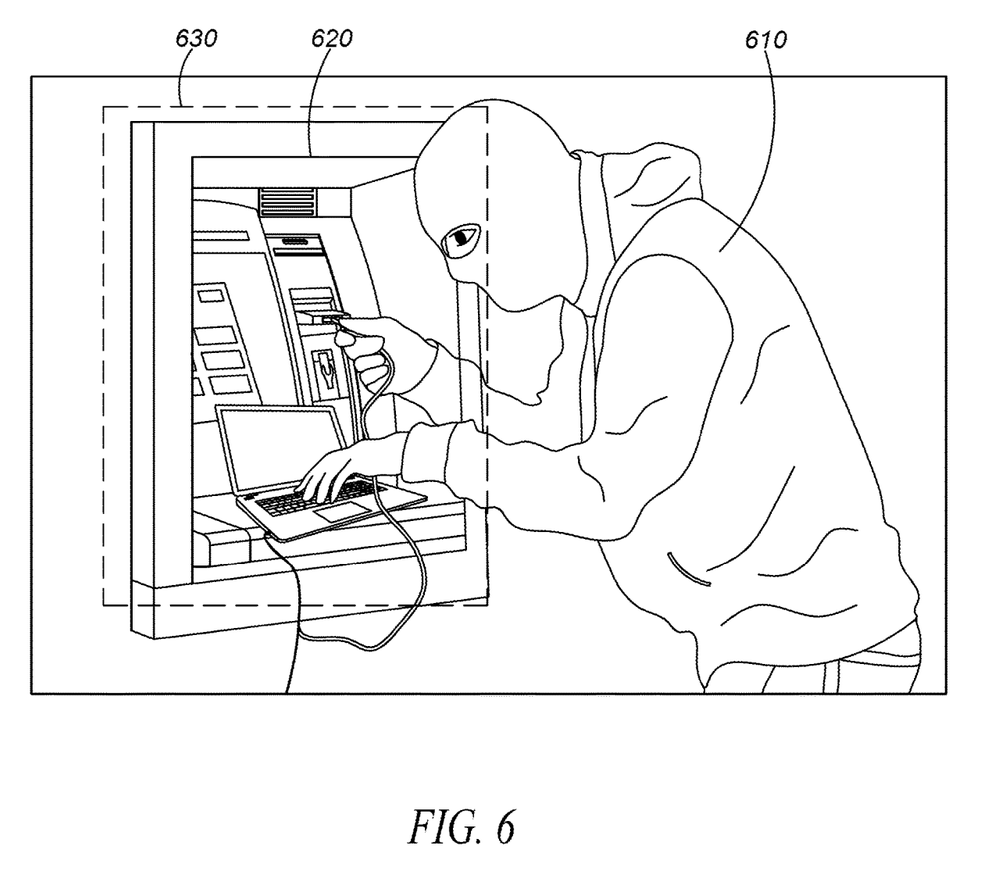
FIG. 6 is a diagram illustrating, in accordance with an example embodiment, an image of a thief engaging in nefarious behavior at an automated teller machine.

Reference is now made to FIG. 6. FIG. 6 is a diagram illustrating, in accordance with an example embodiment, an image of a thief 610 engaging in nefarious behavior at an automated teller machine 620.

Pixel region 630 is illustrated in FIG. 6 as a region which is smaller than an entire image region corresponding to the aforementioned FOV of the fixed-location camera that is aimed at the automated teller machine 620 and its immediately surrounding physical environment. The pixel region 630 is a relevant example region for blocked view analytics (for example, pixel region in respect of the action 230 of FIG. 2 is applicable). It will be understood that image details provided by the pixel region 630 provide more information (than a remainder of the FOV) about what are the interactions of the thief 610 with the automated teller machine 620.

The location and dimensions of the pixel region 630 may be set manually (for example, by a user drawing a rectangle with a graphical user interface). Alternatively, the location and dimensions of the pixel region 630 may be set automatically (for example, by operation of the camera's or other video analytics which detects and recognizes objects for which a blocked view response may be needed).

Still with reference to FIG. 6, a lockout mode may be triggered in response to a blocked view alert, which may in turn occur in response to a blocked view threshold being satisfied when a sufficient percentage of the pixel region 630 is occupied by pixels corresponding to the thief 610 (or some other movable object which impedes viewing of the automated teller machine 620). During the lockout mode, the automated teller machine 620 may suspend cash dispensing and/or become unresponsive to some or all user input.

Figure 7:
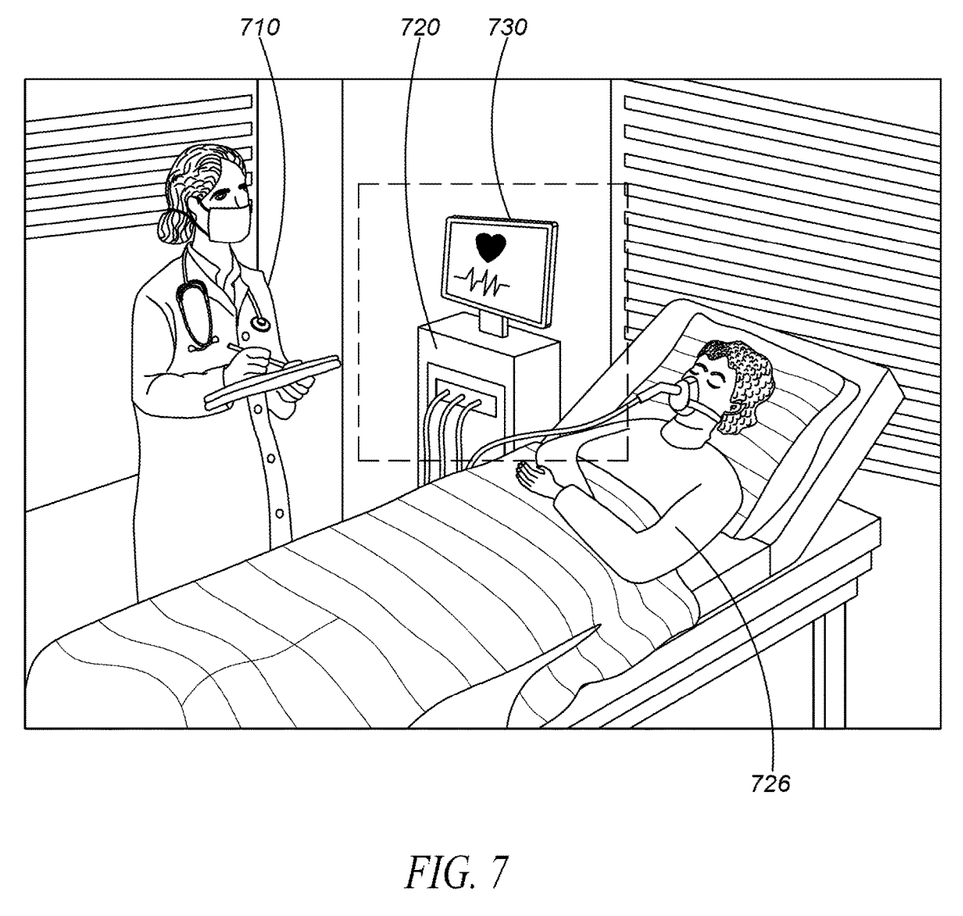
FIG. 7 is a diagram illustrating, in accordance with an example embodiment, an image of a hospital worker beside medical equipment attached to a patient in a hospital.

Reference is now made to FIG. 7. FIG. 7 is a diagram illustrating, in accordance with an example embodiment, an image of a hospital worker 710 beside medical equipment 720 attached to a patient 726 in a hospital.

Pixel region 730 is illustrated in FIG. 7 as a region which is smaller than an entire image region corresponding to the aforementioned FOV of the fixed-location camera that is aimed at the medical equipment 720 and its immediately surrounding physical environment. The pixel region 730 is a relevant example region for blocked view analytics (for example, pixel region in respect of the action 230 of FIG. 2 is applicable). It will be understood that image details provided by the pixel region 730 provide more information (than a remainder of the FOV) about what are the interactions of the hospital worker 710 with the medical equipment 720.

The location and dimensions of the pixel region 730 may be set manually (for example, by a user drawing a rectangle with a graphical user interface). Alternatively, the location and dimensions of the pixel region 730 may be set automatically (for example, by operation of the camera's or other video analytics which detects and recognizes objects for which a blocked view response may be needed).

Still with reference to FIG. 7, a lockout mode may be triggered in response to a blocked view alert, which may in turn occur in response to a blocked view threshold being satisfied when a sufficient percentage of the pixel region 730 is occupied by pixels corresponding to the hospital worker 710 (or some other movable object which impedes viewing of the medical equipment 720). During the lockout mode, the medical equipment 720 may become unresponsive to some or all user input. For example, the hospital worker 710 may still be able to see displayed vital signs and other displayed information, but the hospital worker 710 may be locked out from changing setting(s) of the medical equipment 720 as they were set just prior to the commencement of the lockout.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etcetera, and cannot cause a network addressable machine to enter a lockout mode, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method carried out within at least one network, the at least one network including at least one network addressable machine, the at least one network also including at least one fixed-location camera having a respective Field Of View (FOV), and the computer-implemented method comprising:
creating, by operation of an at least one processor, an operation dependency definition between the fixed-location camera and the network addressable machine based on an inclusion of the network addressable machine within the FOV;
operating the fixed-location camera to capture live video;
employing video analytics, by operation of the at least one processor, to generate a blocked view alert in response to a blocked view threshold being satisfied in relation to the live video, the blocked view threshold being satisfied when a percentage of a pixel region of the FOV, corresponding to pixels occupied by a movable object present in the pixel region of the FOV, is more than a defined amount; and
in response to the blocked view alert, causing the network addressable machine to enter a lockout mode,
wherein the network addressable machine is an Internet of Things (IoT) device,
wherein the IoT device includes at least one storage compartment for cash, and
wherein the at least one storage compartment is inaccessible during the lockout mode.

2. The computer-implemented method of claim 1 wherein the IoT device includes a user input panel for controlling equipment communicatively coupled thereto.

3. The computer-implemented method of claim 1 wherein configuration settings of the IoT device are inaccessible during the lockout mode.

4. The computer-implemented method of claim 1 wherein the employing of the video analytics includes automatically recognizing, after the blocked view alert, that the FOV has become unblocked.

5. The computer-implemented method of claim 4 further comprising: in response to the recognizing that the FOV has become unblocked, causing the network addressable machine to exit the lockout mode.

6. The computer-implemented method of claim 1 wherein the employing of the video analytics is carried out in a server remote from both the network addressable machine and the fixed-location camera.

7. The computer-implemented method of claim 1 wherein at least a portion of the live video captured by the fixed-location camera is recorded in at least one non-volatile storage.

8. Network apparatus comprising:
at least one network addressable machine;
at least one fixed-location camera having a respective Field Of View (FOV), and the fixed-location camera being configured to capture live video;
at least one processor; and
at least one electronic storage medium in communication with the at least one processor, the at least one electronic storage medium storing program instructions that when executed by the at least one processor cause the at least one processor to perform:
creating an operation dependency definition between the fixed-location camera and the network addressable machine based on an inclusion of the network addressable machine within the FOV;
carrying out video analytics to generate a blocked view alert in response to a blocked view threshold being satisfied in relation to the live video, the blocked view threshold being satisfied when a percentage of a pixel region of the FOV, corresponding to pixels occupied by a movable object present in the pixel region of the FOV, is more than a defined amount; and
causing, in response to the blocked view alert, the network addressable machine to enter a lockout mode,
wherein the network addressable machine is an Internet of Things (IoT) device,
wherein the IoT device includes at least one storage compartment for cash, and
wherein the at least one storage compartment is inaccessible during the lockout mode.

9. The network apparatus of claim 8 wherein the IoT device includes a user input panel for controlling equipment communicatively coupled thereto.

10. The network apparatus of claim 8 wherein configuration settings of the IoT device are inaccessible during the lockout mode.

11. The network apparatus of claim 8 wherein the carrying out of the video analytics includes automatically recognizing, after the blocked view alert, that the FOV has become unblocked.

12. The network apparatus of claim 8 wherein the at least one processor is a plurality of processors.

13. The network apparatus of claim 12 further comprising a server remote from both the network addressable machine and the fixed-location camera, the server including at least one of the plurality of processors, and the at least one of the plurality of processors is configured to carry out the video analytics.

14. The network apparatus of claim 8 wherein: the at least one electronic storage medium is a plurality of electronic storage media, and at least a portion of the live video captured by the fixed-location camera is recorded in at least one non-volatile storage of the electronic storage media.

* * * * *